Sept. 22, 1925.　　　　　　　　　　　　　　　　1,554,943
V. ANTOINE
MEANS FOR RECOVERING MATTERS CONTAINED IN WASTE WATER FROM
PAPER MANUFACTURE OR THE LIKE
Filed Dec. 28, 1921　　　2 Sheets-Sheet 1

Inventor
V. Antoine
by
Atty

Patented Sept. 22, 1925.

1,554,943

UNITED STATES PATENT OFFICE.

VICTOR ANTOINE, OF LAMBERMONT, NEAR VERVIERS, BELGIUM.

MEANS FOR RECOVERING MATTERS CONTAINED IN WASTE WATER FROM PAPER MANUFACTURE OR THE LIKE.

Application filed December 28, 1921. Serial No. 525,370.

*To all whom it may concern:*

Be it known that I, VICTOR ANTOINE, a subject of the King of the Belgians, residing at Lambermont, near Verviers, in the Kingdom of Belgium, have invented certain new and useful Improvements in Means for Recovering Matters Contained in Waste Water from Paper Manufacture or the like, of which the following is a specification.

This invention relates to improved means for recovering matters such as paper pulp, cellulose and the like contained in waste water from paper manufacture or the like.

One object of my invention is to secure improved means for recovering useful matters in a more or less diluted state in such a manner that the said matters may be reused continuously in the manufacture.

A further object of my invention consists in so separating the said matters from the water in which they are contained that any substantial wear of the parts of the mechanical means can be successfully prevented.

With these objects in view my invention esentially consists in special combinations of steps and of mechanical elements as will be hereinafter fully described and pointed out in the appended claims.

Referring to the annexed drawing which shows one way of carrying my invention into practice:

Figure 1:
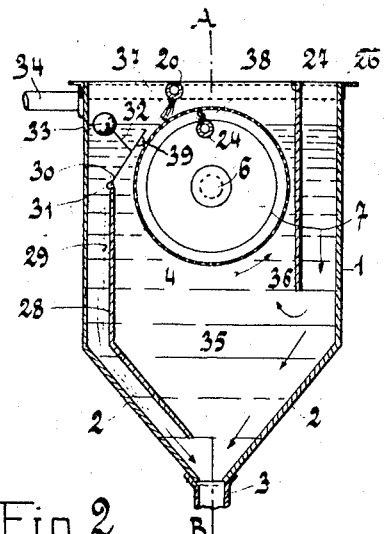
Fig. 1 is a transverse section through an apparatus especially adapted for the purpose.
Figure 2:
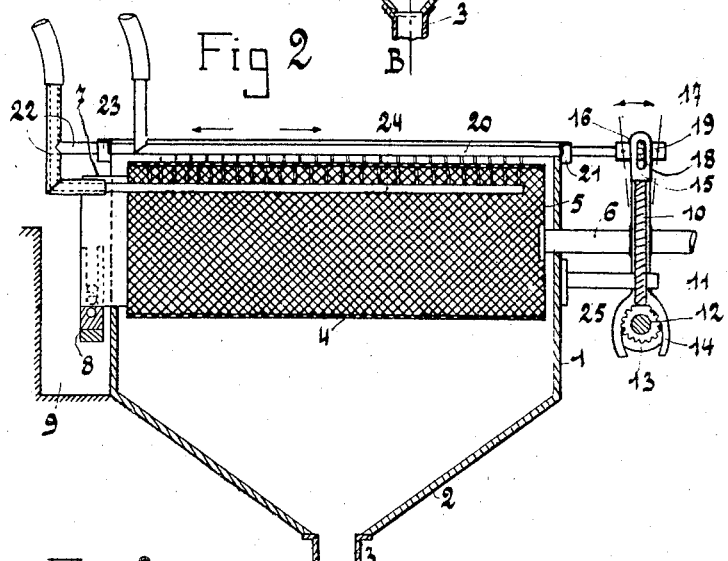
Fig. 2 is a longitudinal section of said apparatus taken on line A—B in Fig. 1.
Figure 3:
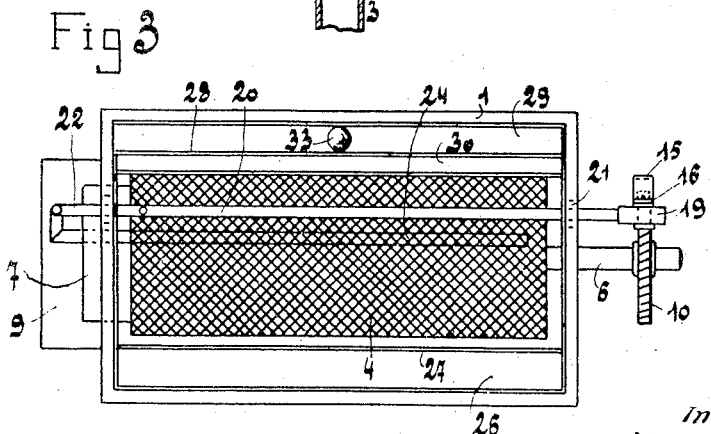
Fig. 3 is a top view of the apparatus.
Figure 4:
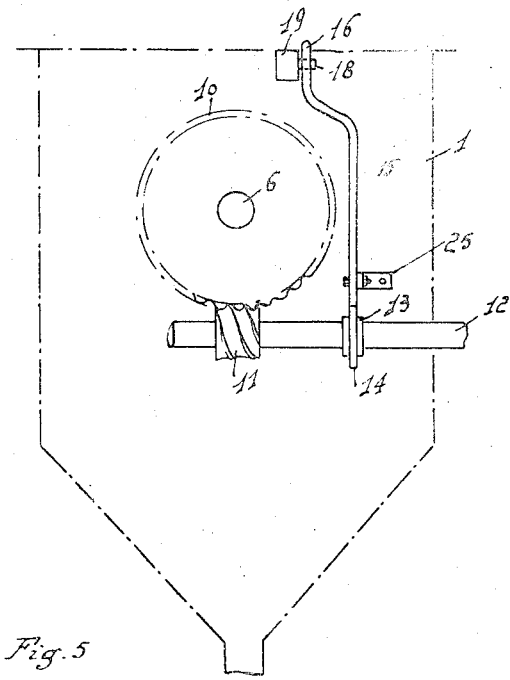
Fig. 4 is a side elevation showing particularly the means for operating the drum and pipe.
Figure 5:
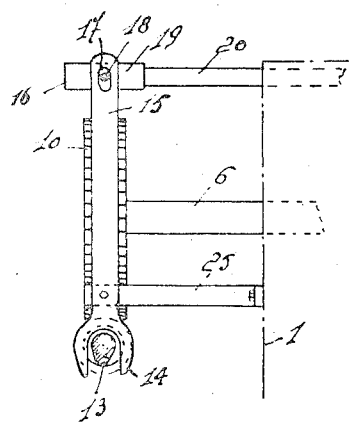
Fig. 5 is an edge view of the same.
Figure 6:
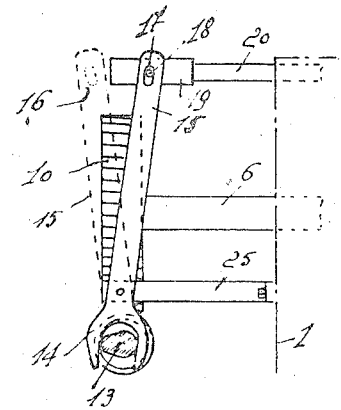
Fig. 6 is a similar view showing the lever in operated position.

The methods previously used for recovering matters contained in waste water from paper manufacture may be divided into two groups 1° the methods operating by a decanting or settling action and 2° the methods operating by a straining action in which a rotary and permeable drum is generally used through which the water in treatment is passed in such a manner that the matters recovered on said drum can be collected or carried away by a roller or felt rotating in contact with the drum.

The decanting or settling method requires, as it is well known the use of very voluminous apparatus; further as the decanting action only takes place in a satisfactory manner when the liquid under treatment is absolutely immovable, the yield of the apparatus is generally low.

The methods based upon the straining action, on the other side, have the inconvenience of securing only recovered products in a semi-solid state, the recovered products must be stored up until they are reused, become injured by fermentation and can no more be used again for the manufacture of papers of first quality; further the drum of the apparatus is exposed to great wear as indeed the collecting roller or felt rubs with pressure against said drum.

These drawbacks are avoided according to my invention by dividing the current of water under treatment into a principal current and a secondary current, the matters contained in the principal current being accumulated by a shifting operation, being then separated from the principal current and finally returned continuously in the secondary current which carries away the said recovered products and brings them again to the point of utilization.

The apparatus which is used to carry this method into practice is in fact a combination of a decanting apparatus and of a collecting drum.

It comprises a vessel 1 of rectangular section the bottom of which is provided with inclined walls 2 forming a conical part to which a pipe 3 is connected, said pipe being provided with a discharge cock or valve (not shown) adapted to control the flow of the secondary current of water. A perforated drum 4 is rotated in said vessel 1, the drum being formed by way of example from a suitable wire-gauze. The said drum is closed on one side by a solid wall 5 supported by a shaft 6 rotating in a suitable bearing arranged outside the vessel 1. At the other end, the drum 4 forms a tubular portion 7 of great diameter having a solid wall and resting on rollers or balls 8. The said tubular portion 7 ends in a discharging channel 9.

The drum 4 is rotated by a screw-gear 10 mounted on the shaft 6 and which is driven by a screw 11 on a shaft 12; on said shaft is also provided an eccentric 13 acting in a fork 14 at the end of a lever 15 which acts at the end 16 by a slit 17 on a pin or stud 18 fixed in a rod 19 arranged coaxially with a pipe 20 sliding in a support 21 on the vessel 1. The pipe 20 is supported at its other end, by an angular connection 22 sliding in a support 23 fixed to the vessel 1. A second pipe 24 extending longitudinally inside the drum 4, is further connected to the angular connection 22. The pipes 20 and 24 are perforated along the periphery of the drum 4 in their parts adjacent thereto.

The eccentric lever 15 is pivotally guided in a support 25 so as to be caused to take inclined positions under the action of the eccentric 13 thus giving a to and fro movement to the pipes 20 and 24 in the longitudinal direction of the drum 4.

The water under treatment is fed into the vessel 1 through a channel 26 formed in the vessel 1 by a partition 27. On the side opposite said partition, the vessel 1 is provided with a second partition 28 forming a channel or duct 29 extending into the lower part of the conical bottom 2. To the upper end of the partition 28 a plate 30 is hinged at 31 and the said plate is connected by a rigid rod 32 to a float 33 floating in the water or other liquid contained in the vessel 1, which is further provided with an overflow pipe 34.

The apparatus just described acts as follows:

The water to be treated enters into the vessel 1 through channel 26 and passes into the principal chamber 35 formed in the vessel 1. In said chamber the current is divided into two parts; the first part forming the principal current passes through the wire-gauze of the drum 4 and escapes through the cylindrical portion 7 into the channel 9; the second part, forming the secondary current escapes directly through pipe 3 in a given quantity which is controlled by the discharge valve or cock inserted in pipe 3. Supposing that chamber 35 is filled with water under treatment, the principal current representing the water in excess, whilst passing through the perforated drum 4 deposes upon the said drum the matters which are contained therein. The drum being rotated through screw 11 and gear 10 covers itself with a layer of solid products, which, after having been carried in the rotation of the drum in the direction shown by the arrow 36, are brought under water jets 37 and 38 which are projected through the orifices in the pipes 20 and 24 outside and inside of the perforated drum 4 on the whole length of this drum.

Under the action of these water-jets, the layer of matters carried by the drum 4 is detached therefrom, passes above the inclined plate 30 into the channel 29 and is returned to the secondary current of water which escapes through pipe 3.

The secondary current of water is consequently charged with the recovered products which are thus returned to the flow of liquid paper which is in course of manufacture.

During the operation, the matters retained by the drum 4, oppose themselves to the passage of new particles contained in the water in such a manner that the layer of matters or products on the drum closing automatically the passages of the wire-gauze of the drum, complete the straining action of the drum which is thus advantageously increased. The detaching action of the water-jets 37 and 38 is increased by the axial movement of the pipes 20 and 24 due to the action of eccentric 13 and lever 15.

The inclined plate 30 is designed to provide an automatically controlled section which forms an incline leading from the drum to channel 29, so that if the materials collected on the exterior of the drum surface become excessive, such materials when jetted off the drum surface will be positively directed into said channel 29 by the inclined plate 30. The action of the inclined plate 30 is controlled automatically by the float 33. To this end, the plate 30 rests, in its most inclined position, on studs 39 fixed on the end walls of vessel 1. As the float 33 follows the variations of the water level, it causes the plate 30 to take variable inclinations according to the efficiency of the sifting drum 4. If the drum is too much charged with products and thus prevents the free passage of the principal current of water therethrough the level ascends in the vessel 1. The float being rigidly connected to the plate 30, causes this plate to incline and to approach the drum thus causing the escape through channel 29 of the totality of the products detached from the drum. On the contrary if the water under treatment contains only few matters in such a manner that the efficiency of the shifting drum is very low, the level of water in the vessel 1 remains low also and the plate 30 is kept upright under the action of the float. In this case, the matters or products detached from the drum by the water-jets 37—38 are retained in the principal current and again carried by said current on the periphery of the drum.

Should the level in vessel 1 exceed a maximum the water in excess can escape through the overflow pipe 34.

The liquid used for detaching the products from the periphery of the drum, must not necessarily be water; any fluid under pressure steam or air for example can also be used for the purpose.

What I claim is:

1. Means for recovering products contained in waste water from paper manufacture, the said means comprising a vessel having a conical bottom, a discharge orifice at the bottom of said vessel a permeable drum adapted to rotate in said vessel, a partition forming a feeding channel in said vessel the said partition extending below the permeable drum, whereby the water fed into the vessel is divided into a principal current and a secondary current of water, a tubular discharging portion connected laterally to the drum whereby the principal current of water can be discharged from the inside of said drum laterally to the vessel, pressure fluid jets adapted to act on the periphery of the drum a partition forming a lateral channel from the upper part to the bottom of the vessel, the said partition being provided at its upper part with a hinged plate and a float rigidly connected to said plate, whereby the quantity of products returned in the secondary current of water escaping through the discharge orifice at the bottom of the vessel is controlled by the action of the rotary drum.

2. Means for recovering products contained in waste water from paper manufacture and the like, comprising a vessel into which the waste water is admitted, means for dividing said waste water to cause the same to flow from the vessel as a principal current and as a secondary current, the said means including a rotating foraminous collector through which the principal current flows and on which the waste products are strained from said principal current, and means for directing the waste products from said collector into the secondary current of the waste water, said means including a member automatically regulatable by the height of the waste water in the vessel to control the direct admission of the waste products to said secondary current.

3. Means for recovering products contained in waste water from paper manufacture or the like, comprising a vessel having a regulatable secondary discharge orifice, an inlet remote from said orifice, said vessel having a primary discharge above the secondary discharge, a rotatable foraminous collector through which the waste water is compelled to pass to reach the primary discharge, to thereby deposit the waste products on the surface of such collector, means operating to dislodge the waste products from said collector, said vessel having a channel to receive said waste products and direct them to the secondary discharge, a gate automatically operated by the height of waste water in the vessel and controlling the admission of the waste products to said channel.

In testimony whereof I have affixed my signature.

VICTOR ANTOINE.